United States Patent
Mehrotra et al.

(10) Patent No.: US 11,215,961 B2
(45) Date of Patent: Jan. 4, 2022

(54) SYSTEM AND METHOD OF DECLARATIVE MODELING OF A PROCESS FOR AUTOMATION

(71) Applicant: Tata Consultany Services Limited, Mumbai (IN)

(72) Inventors: Prakash Mehrotra, Bellevue, WA (US); Kapil Manshani, Bellevue, WA (US)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 29 days.

(21) Appl. No.: 16/826,060

(22) Filed: Mar. 20, 2020

(65) Prior Publication Data

US 2021/0063986 A1    Mar. 4, 2021

(30) Foreign Application Priority Data

Aug. 30, 2019 (IN) .............................. 201921035116

(51) Int. Cl.
| | |
|---|---|
| G06F 9/44 | (2018.01) |
| G05B 19/042 | (2006.01) |
| G01S 17/04 | (2020.01) |
| G06F 8/35 | (2018.01) |

(52) U.S. Cl.
CPC .......... *G05B 19/0426* (2013.01); *G01S 17/04* (2020.01); *G05B 19/0428* (2013.01); *G06F 8/35* (2013.01); *G05B 2219/23008* (2013.01); *G05B 2219/24034* (2013.01)

(58) Field of Classification Search
None
See application file for complete search history.

(56) References Cited

U.S. PATENT DOCUMENTS

| | | |
|---|---|---|
| 5,875,333 A | 2/1999 | Fish et al. |
| 7,032,210 B2 | 4/2006 | Alloing et al. |
| 2004/0181775 A1* | 9/2004 | Anonsen ............... G06Q 10/10 717/104 |

(Continued)

FOREIGN PATENT DOCUMENTS

KR    10-2015-0060174    6/2015

*Primary Examiner* — Wei Y Zhen
*Assistant Examiner* — Lanny N Ung
(74) *Attorney, Agent, or Firm* — Finnegan, Henderson, Farabow, Garrett & Dunner LLP

(57) ABSTRACT

In the field of process automation there exists one or more custom solutions which are not scalable and missing essential needs to automate a process. This disclosure addresses the problem of codifying a process to automate by a declarative approach. A method for declarative modeling of process for automation is provided. The method includes receiving, request for automating the process; extracting, at least one feature associated with the process to obtain a declarative model; validating, the declarative model of the process with a process automation code to obtain a process automation package; provisioning, the declarative model to access and obtain specific roles associated with the process; executing, the process automation package in a process automation platform based on the specific roles to obtain a plurality of states; and monitoring, the plurality of states and triggers at least one action associated with the plurality of states in the process automation platform.

18 Claims, 5 Drawing Sheets

(56) References Cited

U.S. PATENT DOCUMENTS

| | | | |
|---|---|---|---|
| 2005/0114832 A1 | 5/2005 | Manu | |
| 2007/0028220 A1* | 2/2007 | Miller | G06K 9/6251 |
| | | | 717/124 |
| 2007/0250812 A1* | 10/2007 | Sanghvi | G06Q 10/06 |
| | | | 717/117 |
| 2008/0320486 A1* | 12/2008 | Bose | G06Q 10/10 |
| | | | 718/105 |
| 2009/0157445 A1* | 6/2009 | Morinville | G06Q 10/10 |
| | | | 705/7.27 |
| 2016/0357526 A1* | 12/2016 | Soffer | G06F 8/38 |
| 2017/0083013 A1* | 3/2017 | Li | G05B 17/02 |
| 2019/0251063 A1* | 8/2019 | Colla | G06F 16/164 |

* cited by examiner

SYSTEM AND METHOD OF DECLARATIVE MODELING OF A PROCESS FOR AUTOMATION

PRIORITY CLAIM

This U.S. patent application claims priority under 35 U.S.C. § 119 to: India Application No. 201921035116, filed on 30 Aug. 2019. The entire contents of the aforementioned application are incorporated herein by reference.

TECHNICAL FIELD

This disclosure relates generally to process automation, and, more particularly, to system and method of declarative modeling of a process for automation.

BACKGROUND

Well-defined business processes are typically automated via new system implementations, however there is a large class of well-defined business processes for which existing systems cannot be changed for a multitude of reasons. The field of Business Process Automation addresses this need and provides a way to automate this class of business processes. Automating such processes can deliver huge personnel savings to such businesses. Conventional systems and products implement process automation today using various mechanisms however they do not cover many needs of automation.

Classical approaches to automation follow two paradigms, (i) Imperative, where one describes computation in terms of statements that change a program state. Imperative constructs define sequences of commands for the computer to perform, and (ii) Declarative, where one expresses logic of a computation without describing its control flow. The declarative constructs describe what the automation should accomplish, rather than describing how to go about accomplishing it.

Conventional methods and systems for business process automation do not provide coverage required to address all aspects of process automation, leaving implementation of many capabilities to be provided as system features than being part of the process declaration itself. Having predefined system level capabilities to process level configuration makes conventional business process automation systems rigid. Traditional business process automation primarily addresses no-touch end to end automation only.

SUMMARY

Embodiments of the present disclosure present technological improvements as solutions to one or more of the above-mentioned technical problems recognized by the inventors in conventional systems. For example, in one aspect, processor implemented method for declarative modeling of at least one process for automation is provided. The processor implemented method includes at least one of: receiving, via one or more hardware processors, a request for automating the at least one process; extracting, via the one or more hardware processors, at least one feature associated with the at least one process by defining at least one process definition to obtain a declarative model; generating, via the one or more hardware processors, an automation code specific to the at least one process to be automated based on the at least one of process definition; validating, via the one or more hardware processors, the declarative model of the at least one process with the generated automation code to obtain a process automation package; provisioning, via the one or more hardware processors, the declarative model to access the process automation package to obtain a plurality of specific roles associated with the at least one process; executing, via the one or more hardware processors, the process automation package in a process automation platform, based on the obtained plurality of specific roles to obtain a plurality of states associated with a process execution; and dynamically monitoring, via the one or more hardware processors, the plurality of states associated with the process execution and triggering at least one action associated with the plurality of states of the process execution in the process automation platform. In an embodiment, the at least one features corresponds to at least one of: (i) meta-data, (ii) control information, (iii) parameters, (iv) data entities, (v) security information, (vi) process model, and (vii) user-interaction points subsections.

In an embodiment, the process automation package may include (i) the process definition and (ii) the process automation code as a single distributable entity. In an embodiment, the declarative model may include a plurality of sections to specify the process definition. In an embodiment, the metadata process may include additional process information such as name, description, author, version, and details regarding creation of process. In an embodiment, the control information may include supplementary information of the at least one process, including version and details about compatibility of the process automation platform.

In an embodiment, the parameters may include at least one input associated with the at least one process along with at least one of (i) corresponding type, (ii) data restrictions, and (iii) default values. In an embodiment, the data entities may include definition of the data entities required for the process automation platform to manage the at least one process. In an embodiment, the security information may include at least one security identifier that defines a plurality of dynamic access levels of the process which can be managed by the process automation platform for a plurality of users. In an embodiment, the user interaction points subsections may define standard or custom user interfaces to interact with one or more users of the process automation platform at specific points during the execution of the at least one process. In an embodiment, the declarative model may include information on action of breaking down the at least one process into subsections. In an embodiment, each subsection maintains a tracking information on process.

In another aspect, there is provided a processor implemented system to declarative model at least one process for automation is provided. The system comprises a memory storing instructions; one or more communication interfaces; and one or more hardware processors coupled to the memory via the one or more communication interfaces, wherein the one or more hardware processors are configured by the instructions to: receive, a request to automate for the at least one process; extract, at least one feature associated with the at least one process by defining at least one process definition to obtain a declarative model; generate, an automation code specific to the at least one process to be automated based on the at least one of process definition; validate, the declarative model of the at least one process with the generated automation code to obtain a process automation package; provision, the declarative model to access the process automation package to obtain a plurality of specific roles associated with the at least one process; execute, the process automation package in a process automation platform based on the obtained plurality of specific roles to obtain a plurality of states associated with a process execution; and dynamically monitor, the plurality of states associated with the process execution and triggers at least one action associated with the plurality of states of the process execution in the process automation platform. In an embodiment, the at least one features corresponds to at least one of: (i) meta-data, (ii) control information, (iii) parameters, (iv) data entities, (v) security information, (vi) process model, and (vii) user-interaction points subsections.

In an embodiment, the process automation package may include (i) the process definition, and (ii) the process automation code as a single distributable entity. In an embodiment, the declarative model may include a plurality of sections to specify the process definition. In an embodiment, the metadata may include additional process information such as name, description, author, version, and details regarding creation of process. In an embodiment, the control information may include supplementary information of the at least one process, including version and details about compatibility of the process automation platform.

In an embodiment, the parameters may include at least one input associated with the at least one process along with at least one of (i) corresponding type, (ii) data restrictions, and (iii) default values. In an embodiment, the data entities may include definition of the data entities required for the process automation platform to manage the process. In an embodiment, the security information may include at least one security identifier that defines a plurality of dynamic access levels of the process which can be managed by the process automation platform for a plurality of users. In an embodiment, the user interaction points subsections may define standard or custom user interfaces to interact with one or more users of the process automation platform at specific points during the execution of the at least one process. In an embodiment, the declarative model may include information on action of breaking down the at least one process into subsections. In an embodiment, each subsection maintains a tracking information on process.

In yet another aspect, there are provided one or more non-transitory machine readable information storage mediums comprising one or more instructions which when executed by one or more hardware processors causes at least one of: receiving, via one or more hardware processors, a request for automating the at least one process; extracting, via the one or more hardware processors, at least one feature associated with the at least one process by defining at least one process definition to obtain a declarative model; generating, via the one or more hardware processors, an automation code specific to the at least one process to be automated based on the at least one of process definition; validating, via the one or more hardware processors, the declarative model of the at least one process with the generated automation code to obtain a process automation package; provisioning, via the one or more hardware processors, the declarative model to access the at least one process automation package to obtain a plurality of specific roles associated with the process; executing, via the one or more hardware processors, the process automation package in a process automation platform based on the obtained plurality of specific roles to obtain a plurality of states associated with a process execution; and dynamically monitoring, via one or more hardware processors, the plurality of states associated with the process execution and triggering at least one action associated with the plurality of states of the process execution in the process automation platform. In an embodiment, the at least one features corresponds to at least one of: (i) meta-data, (ii) control information, (iii) parameters, (iv) data entities, (v) security information, (vi) process model, and (vii) user-interaction points subsections.

In an embodiment, the process automation package may include (i) the process definition and (ii) the process automation code as a single distributable entity. In an embodiment, the declarative model may include a plurality of sections to specify the process definition. In an embodiment, the metadata may include additional process information such as name, description, author, version, and details regarding creation of process. In an embodiment, the control information may include supplementary information of the at least one process, including version and details about compatibility of the process automation platform.

In an embodiment, the parameters may include at least one input associated with the at least one process along with at least one of (i) corresponding type, (ii) data restrictions, and (iii) default values. In an embodiment, the data entities may include definition of the data entities required for the process automation platform to manage the at least one process. In an embodiment, the security information may include at least one security identifier that defines a plurality of dynamic access levels of the process which can be managed by the process automation platform for a plurality of users. In an embodiment, the user interaction points subsections may define standard or custom user interfaces to interact with one or more users of the process automation platform at specific points during the execution of the at least one process. In an embodiment, the declarative model may include information on action of breaking down the at least one process into subsections. In an embodiment, each subsection maintains a tracking information on process.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
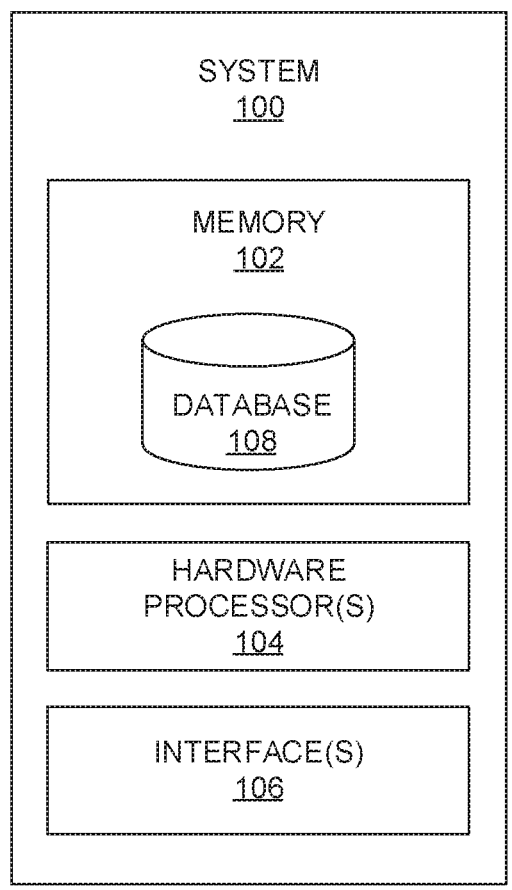
FIG. 1 is a block diagram illustrating a system for declarative modelling of process for automation, according to embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments of the present invention provide a method to achieve process automation (e.g., business process automation) by using a declarative construct of one or more business processes to be automated by a system. The declarative construct itself utilizes common open formats like Extensible Markup Language (XML) or JavaScript Object Notation (JSON) that keeps the declarative construct non-proprietary and lends itself to extensibility. The embodiments of the present invention takes the declarative approach contextualizing to needs of end to end process automation.

Referring now to the drawings, and more particularly to FIG. 1 through 4, where similar reference characters denote corresponding features consistently throughout the figures, there are shown preferred embodiments and these embodiments are described in the context of the following exemplary system and/or method.

FIG. 1 is a block diagram illustrating a system 100 for declarative modeling of a process for automation, according to embodiments of the present disclosure. In an embodiment, the system 100 includes one or more hardware processors 104, one or more interfaces 106 (e.g., communication interface device(s) or input/output (I/O) interface(s)), and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, at least one of (i) declarative specification of process, (ii) previous process execution history and execution data, (iii) previously stored data for any defined entities of the process, (iv) identity of a user executing the process, and (v) business rules code. The database 108 may store at least one of input or element (i) meta-data associated with the process, (ii) control information associated with the process, (iii) parameters associated with the process, (iv) data entities associated with the process, (v) security information associated with the process, (vi) model associated with the process, and (vii) at least one user-interaction points.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology.

Figure 2:
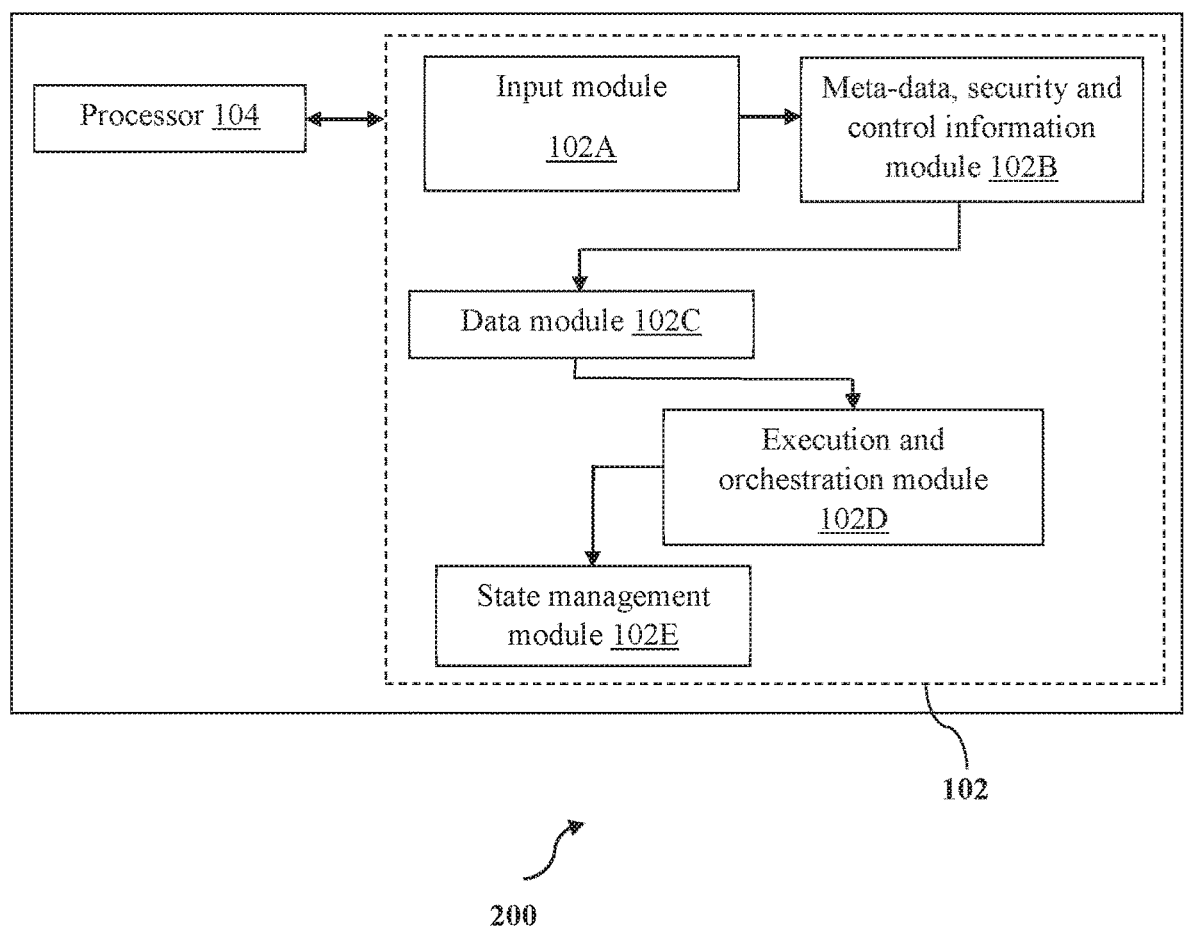
FIG. 2 illustrates an example implementation of the system of FIG. 1 for declarative modelling of the process for automation, according to embodiments of the present disclosure.

FIG. 2 illustrates an example implementation of the system of FIG. 1 for declarative modeling of the process for automation according to embodiments of the present disclosure. A process automation system 200 includes the processor 104, and the memory 102. In an embodiment, the memory 102 further includes an input module 102A, a meta-data, security and control information module 102B, a data module 102C, an execution and orchestration module 102D, and a state management module 102E. In another embodiment, the one or more processors 104 of the process automation system 200 may include one or more modules configured with one or more instructions for declarative modeling of at least one process for automation.

The process automation system 200 can be configured to receive at least one request to automate at least one process, as input. In an embodiment, the process corresponds to at least one business process. In an embodiment, the exemplary process automation system 200 utilizes a JavaScript object notation (JSON) as a means to declare various features of the process such that these features can be dynamically fulfilled by a host system (e.g., the process automation system 200) responsible for automating such a declared process. In an embodiment, the exemplary process automation system 200 utilizes the JSON but not limited to other languages like the Extensible markup language (XML), a Yet another markup language (YAML), etc., as the language in which the declaration are coded.

In an embodiment, the exemplary process automation system 200 is configured to receive one or more implementation of rules as a compiled code. In an embodiment, the exemplary process automation system 200 relies on a historical process execution and couples with declared process control information to provide resume/restart capabilities for the process execution.

The input module 102A is configured to collect data pertaining to at least one of following as an input: (i) declarative specification of process, (ii) previous process execution history and execution data, (iii) previously stored data for any defined entities of the process, (iv) identity of the user executing the process, and (v) business rules code. The input module 102A is also configured to consider as a declaration of the process which consists at least one of following (i) meta-data associated with the process, (ii) control information associated with the process, (iii) parameters associated with the process, (iv) data entities associated with the process, (v) security information associated with the process, (vi) model associated with the process, and (vii) at least one user-interaction point.

In an embodiment, the input module 102A validates sanity of the declarative elements against a defined system schema to avoid any failures in processing. In an embodiment, the parameters associated with the process defined which includes validation attributes such as (i) data type, (ii) default value and (iii) format restrictors by specifying restrictions as regular expressions. The attributes are used by the input module 102A to accept input values via various modalities like a user interface (UI) form or a service interface and validate them against the defined restrictions. The meta-data, security and control information module 102B is configured to display identifying information of the process being automated. For example, the meta-data, security and control information module 102B provides identifying information about the process such as a name, a description, creation and published date, author of this process, version of the process etc.

The meta-data, security and control information module 102B is also configured to handle dynamic security aspects as declared for the process being automated. A plurality of security identifiers are declared as one or more roles that the process to be automated under consideration gets identified. The plurality of security identifiers are used to determine if the user can change input parameters for a process execution and which data entities declared for the process can user modify. In an embodiment, a security context of the user is additionally passed by the meta-data, security and control information module 102B to the execution and orchestration module 102D to control access of certain business rules coded for the business process automation or to determine automation flow for the user executing the process automation.

The meta-data, security and control information module 102B is also configured to handle control information declared for process being automated. The control information declared for the process under automation is of two types (i) a set of attributes that determine under what context a process execution needs to happen and (ii) a set of information that determines how process execution data needs to be handled when stored remotely. In an embodiment, the second type of control information is used by the state management module 102E to decide how it does state management. In an embodiment, the control information is for the larger automation platform to determine how to understand a process definition. For example, a version of the declarative model itself and also include other details that inform the automation platform that which platform features supports the specific process.

The meta-data, security and control information module 102B also consider the historical execution of a process and related execution data in generating signals for the execution & orchestration module 102D. In an embodiment, the signals determine how the execution & orchestration module 102D handles request for process execution. In an embodiment, the meta-data, security and control information module 102B, if available, also renders process documentation is that is made available to an end user as a quick insight into better understanding the process. In an embodiment, capability fulfills need of the system to provide in-context training to the end users. In an embodiment, the meta-data, security and control information module 102B, based on control information, implements a process package sync capability that automatically updates new versions of a process package or removes already installed process packages if user no longer have permissions to execute concerned process.

The data module 102C is configured to dynamically manage defined data entities as part of the process declaration. In an embodiment, one or more data entity specifies at least one or more data attribute, each having validation attributes such as data type, default value and format restrictors by specifying restrictions as regular expressions. The attributes are used by the data module 102C to accept input values via various modalities like a user interface (UI) form or service interface and validate them against the defined restrictions.

The data module 102C provides a security-controlled user interface to manage records as per defined entity schema which includes one or more operations but not limited to reading, updating, deleting and creating new records. The data module 102C stores and retrieves one or more data entities across one or more process modules using a mechanism with no limit on schema, types or number of data entities that needs to be managed. The data module 102C is configured to dynamically render a security-controlled user interface for managing the data entity values for a process execution. The data module 102C manages acceptance of the values based on the declaration schema of the data entities. The data module 102C dynamically validates the data entities based on declaration schema of the data entity.

The execution & orchestration module 102D is configured to execute process automation and orchestrate required pauses, resumes and restarts of a process execution. The execution & orchestration module 102D provides a mechanism for the user to pause, stop or cancel an active process execution. In an embodiment, once paused, the execution & orchestration module 102D provides a mechanism to stop the execution. In an embodiment, stopped executions can be restarted on a same machine or can be restarted or resumed on any other machine. In an embodiment, state of the stopped process execution is automatically made available to a different machine via the state management module 102E. The execution & orchestration module 102D supports orchestration of business processes that cannot be fully automated end to end. For such processes, orchestrator supports in performing chunks of the business process in automated fashion for other parts that are manual in nature provides user with a user interface to record the manual activity once completed.

The execution & orchestration module 102D supports orchestration of business processes such that at declared points in the execution of the process, user interaction can be enabled. In an embodiment, the declared points exist in the process declaration as one or more labels against which a user interface code is created. In an embodiment, code against each of the one or more labels is validated to exist by the input module 102A. In an embodiment, the execution and orchestration module 102D receive execution process signals via one or more labels to invoke user interaction. In an embodiment, system resumes process execution once the user interaction is completed. The execution & orchestration module 102D also tracks process execution and reports percentage of completion by considering one or more signals sent by a process automation code to the system. In an embodiment, the one or more signals are analyzed in context of the declared process model using a 'progress' algorithm that informs the user how much of the business process under automation has completed.

The execution & orchestration module 102D is configured to visually render a process execution depicting as per the process model which steps and sub-steps have been completed or failed, which step is currently under execution and how much time has the process taken for each step along with start and end times. The execution & orchestration module 102D is configured over a period of time to average execution times and display visually any execution that is deviating from expected run times and if any pro-active measures or analysis is required to being execution time back on track. The execution & orchestration module 102D support with process execution on local processors or remote processors called 'nodes'. For example, executing a process remotely, the system maintains a communication channel open with the remote processor such that all information on remote process execution progress is available to a local system.

The state management module 102E is configured to manage the state of the process execution so as to allow any execution to be stopped, canceled, restarted, re-assigned or reconciled. The state management module 102E is configured to manage the state of a process execution as per control information declared by the process. In an embodiment, as per control information, all or selective execution data is replicated to a remote location. The state management module 102E also reconciles one or more process executions that identifies as being gone wrong and are unresponsive and also supports such execution to be restarted if required.

Figure 3A:
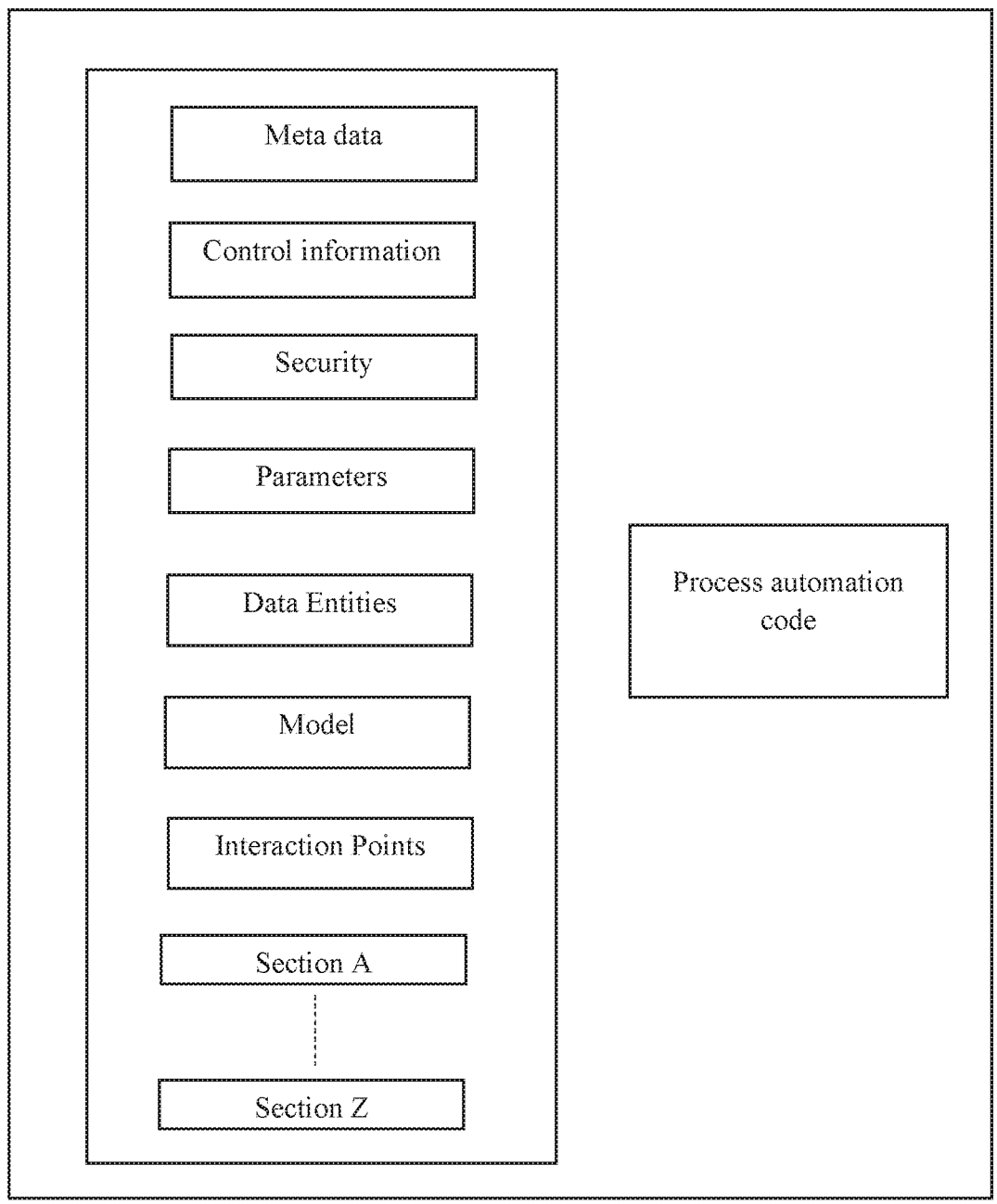
FIG. 3A is an exemplary block diagram illustrates the declarative model and a process automation code forms a process automation package to automate the process, according to embodiments of the present disclosure.

FIG. 3A is block diagram illustrates the declarative model and the process automation code forms a process automation package to automate the process, according to embodiments of the present disclosure. In an embodiment, the process definition and the process automation code are packaged into a single distributable entity that is recognized by the system 200. The declarative model includes at least one of the following: a meta-data, a control information, a security identifier declaration, parameters, data entities, a model, user interaction points, and one or more sections such as section A-section Z. The metadata include one or more identifying information about the process. In an embodiment, the control information includes restrictions on how the process can be automated. The security information defines what roles and capabilities can be assigned to a process automation. The process parameters define what inputs can be provided to a process execution. The data entities specify one or more data attribute, a plurality of which comprises a data entity. The process model which breaks down the process into structure of sub-sections with each sub-section of the model providing a tracking information about process completion and capability of attaching executable code to each sub-section. The user interaction points that are labels against which a user interface code is created. In an embodiment, the executable code can be a platform capability or custom created by the process author. The section A is an indicative section that represents one or more required behavior area for the process to be defined. The Section Z is an indicative of one or more other sub-sections that can be added to the process definition to control the automation behavior.

Figure 3B:
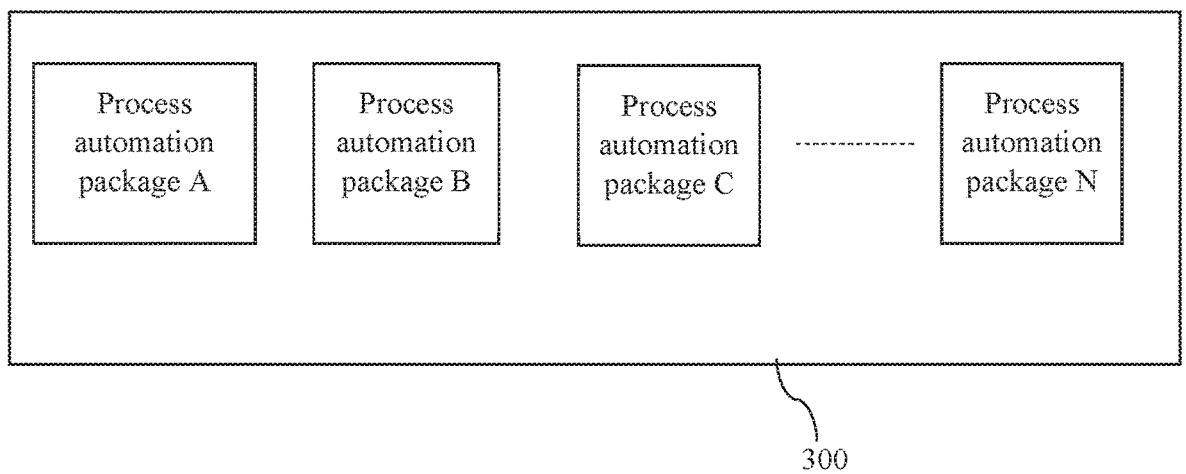
FIG. 3B is an exemplary block diagram illustrates a plurality of process automation packages that form a repository of process automation utilized by the system to automate the process, according to embodiments of the present disclosure.

FIG. 3B is an exemplary block diagram illustrates a plurality of process automation packages form a repository 300 of the process automations utilized by the system 200 to automate the process, according to embodiments of the present disclosure. In an embodiment, process packages that are units of automation for the system 200 on which the one or more process created using the declarative approach can be automated.

Figure 4:
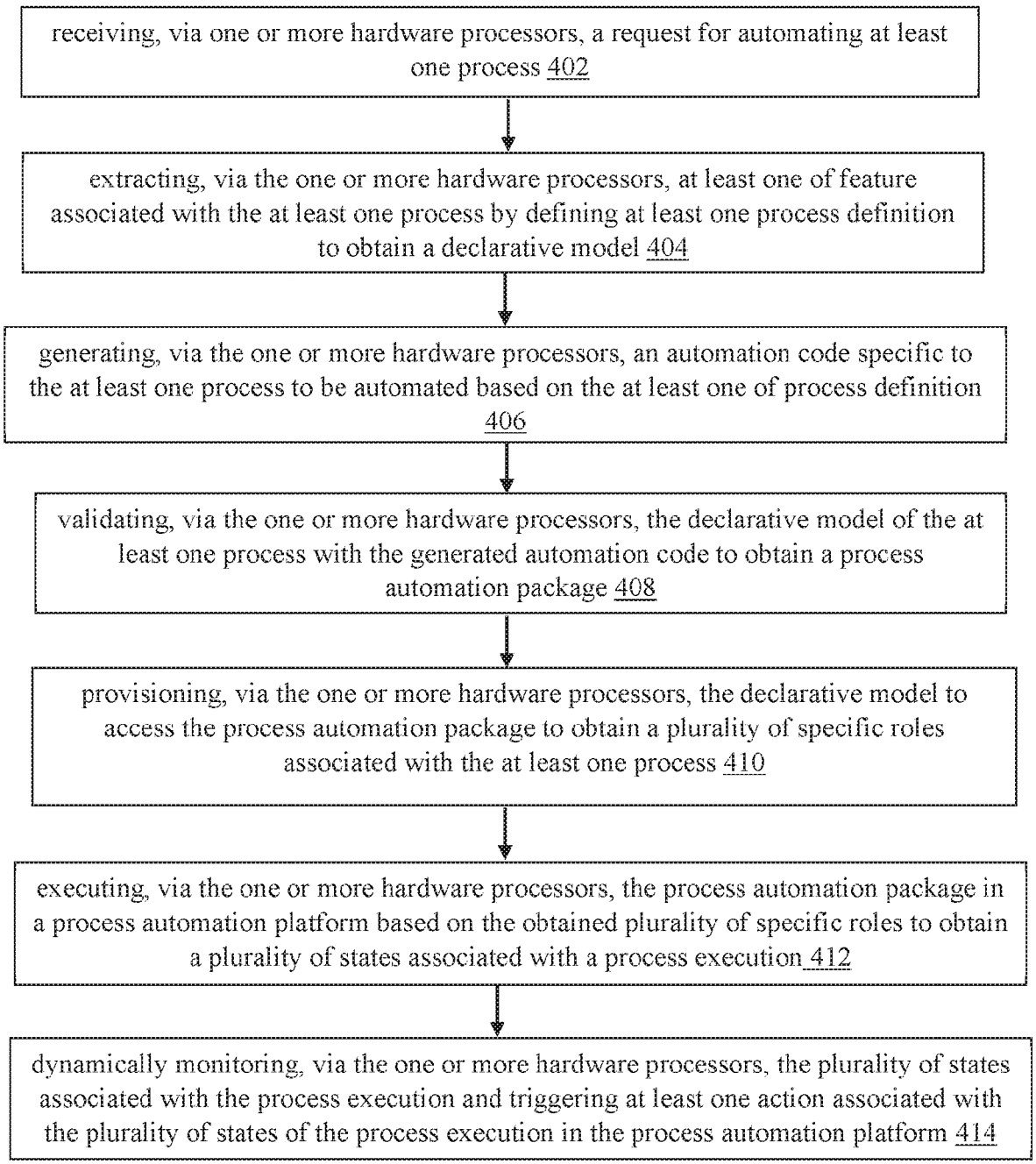
FIG. 4 is an exemplary flow diagram illustrating a method of declarative modeling of the process for automation, according to embodiments of the present disclosure.

FIG. 4 is an exemplary flow diagram illustrating a method of generating the declarative model for the process automation according to embodiments of the present disclosure. The method includes one or more following steps i.e., at step 402, a request for the at least one process to be automated is received. At step 404, at least one of feature associated with the at least one process is extracted by defining at least one process definition to obtain a declarative model. In an embodiment, the at least one features corresponds to at least one of: (i) meta-data, (ii) control information, (iii) parameters, (iv) data entities, (v) security information, (vi) process model, and (vii) user-interaction points subsections. At step 406, an automation code specific is generated to the at least one process to be automated based on the at least one of process definition. At step 408, the declarative model of the at least one process is validated with the generated automation code to obtain a process automation package. At step 410, the declarative model is provisioned to access the process automation package to obtain a plurality of specific roles associated with the process. At step 412, the process automation package is executed in a process automation platform based on the obtained plurality of specific roles to obtain a plurality of states associated with a process execution.

At step 414, the plurality of states of the process execution is dynamically monitored and automatically triggers at least one action associated with the plurality of states of the process execution in the process automation platform. In an embodiment, the plurality of states of the process execution corresponds to at least one but not limited to: (i) failed, (ii) stopped, and (iii) completed. For example, considering the plurality of states of the process execution as "failed" then the associated at least one action can be identifying root cause of failure and take corrective actions such as fixing the process automation or train the user. For example, considering the plurality of states of the process execution as "stopped" then the associated at least one action can be working with the user to understand why the execution is stopped without completion and check are there any new changes came to logic or process is not behaving correctly.

In an embodiment, the process automation package include (i) the process definition and (ii) the process automation code as a single distributable entity. In an embodiment, the declarative model include a plurality of sections to specify the process definition. In an embodiment, the metadata include additional process information such as name, description, author, version, and details regarding creation of process. In an embodiment, the control information include supplementary information of the at least one process, including version and details about compatibility of the process automation platform.

In an embodiment, the parameters include at least one input associated with the at least one process along with at least one of (i) corresponding type, (ii) data restrictions, and (iii) default values. In an embodiment, the data entities include definition of the data entities required for the process automation platform to manage the at least one process. In an embodiment, the security information include at least one security identifier that defines a plurality of dynamic access levels of the process which can be managed by the process automation platform for a plurality of users. In an embodiment, the user interaction points subsections define standard or custom user interfaces to interact with one or more users of the process automation platform at specific points during the execution of the at least one process. In an embodiment, the declarative model include information on action of breaking down the at least one process into subsections. In an embodiment, each subsection maintains a tracking information on process.

The embodiments of the present invention addresses problem of codifying a business process in a declarative fashion that is understood by software and humans alike. It provides an extensible framework to model any business process and get it automated with the least amount of effort, in some instances 100 of the business process can be automated by only creating the model. The embodiments of the present invention addresses problem of control information defining how to interpret execution of a business process that has been automated. Multiple extensible sections that can be purposed to extend this idea of declarative modeling.

The embodiments of the present invention with a declarative approach utilize following to model a process: (a) ability to model roles and permissions providing an extensible model and finer control of capabilities of a business process, (ii) ability to dynamically configure input parameters for a business process and a way to render a graphical user interface (GUI) to accept values for the parameters, (iii) additional capabilities involve specifying how to use a parameter value in event none is specified, (iv) ability to dynamically specify what support for master data management is required and a way to render GUI to help management of that master data, (v) support for user interaction at pre-defined points for an automated business process, (vi) breaking down the model of a business process as a series of automation units through a process model. The embodiments of the present disclosure, the input mechanism is designed to be extensible supporting added system capabilities for business process automation.

The embodiments of the present disclosure utilize one or more provided inputs and executes the defined business process in an automated way by auto generating screens, providing insights into process execution, ability to control process execution and ability for users to interact with the process under automation.

The embodiments of the present invention overcomes the limitation of system level capabilities by building declarative constructs at a process level. It additionally shows a method for a user to interact with a business process under execution. The embodiments of the present invention allows one to increase the scope of automation by allowing processes to be automated end to end and also automate processes with manual process steps as part of the workflow. The embodiments of the present invention also shows a way to report business process completion percentage by monitoring execution signals and mapping those to the declared process model. The embodiments of the present invention additionally addresses a running process to be paused, resumed and re-executed on a different computing machine on which the execution was initially started.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for declarative modeling of at least one process for automation, comprising:

receiving, via one or more hardware processors, a request for automating the at least one process;

extracting, via the one or more hardware processors, at least one feature associated with the at least one process by defining at least one process definition to obtain a declarative model, wherein the at least one feature corresponds to at least one of: (1) metadata, (11) control information, (iii) parameters, (iv) data entities, (v) security information, (vi) process model, and (vii) user-interaction points subsections, wherein the at least one feature associated with the at least one process executes the at least one process in an automated way by auto-generating screens, providing insights into the at least one process execution, controlling the at least one process execution and interacting with a plurality of users for the at least one process under automation;

generating, via the one or more hardware processors, an automation code specific to the at least one process to be automated based on the process definition, wherein the generating considers historical execution of the at least one process and related execution data for handling request for the at least one process execution;

validating, via the one or more hardware processors, the declarative model of the at least one process with the generated automation code to obtain a process automation package;

provisioning, via the one or more hardware processors, the declarative model to access the process automation package to obtain a plurality of specific roles associated with the at least one process, wherein the process automation package comprises (i) the process definition, and (ii) a process automation code as a single distributable entity;

executing, via the one or more hardware processors, the process automation package in a process automation platform, based on the obtained plurality of specific roles to obtain a plurality of states associated with a process execution; and dynamically monitoring, via the one or more hardware processors, the plurality of states associated with the process execution and automatically triggering at least one action associated with the plurality of states of the process execution in the process automation platform, wherein the plurality of states of the process execution corresponds to at least one of (i) failed, (11) stopped, and (iii) completed, wherein if the state of the process execution is failed, then the associated action is identifying root cause of failure and take corrective action, and wherein if the state of the process execution is stopped, then the associated action is working with a user to understand cause of stoppage of execution without completion and check for one or more new changes to the at least one process, and providing a security controlled user interface with no limit on schema and number of the data entities to be managed for the at least one process execution and dynamically validating the data entities based on a declaration schema of the data entities.

2. The method of claim 1, wherein the declarative model comprises of a plurality of sections to specify the process definition.

3. The method of claim 1, wherein the metadata comprises additional process information comprising name, description, author, version, and details regarding creation of process.

4. The method of claim 1, wherein the control information comprises supplementary information of the at least one process, including version and details about compatibility of the process automation platform.

5. The method of claim 1, wherein the parameters comprise at least one input associated with the at least one process along with at least one of (i) corresponding type, (ii) data restrictions, and (iii) default values.

6. The method of claim 1, wherein the data entities comprise definition of the data entities required for the process automation platform to manage the at least one process.

7. The method of claim 1, wherein the security information comprises at least one security identifier that defines a plurality of dynamic access levels of the process which can be managed by the process automation platform for the plurality of users.

8. The method of claim 1, wherein the user interaction points subsections defines standard or custom user interfaces to interact with one or more users of the process automation platform at specific points during the execution of the at least one process.

9. The method of claim 1, wherein the declarative model comprises information on action of breaking down the at least one process into one or more subsections, and wherein each subsection maintains a tracking information on the at least one process.

10. A system (100) to declarative model at least one process for automation, wherein the system comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:

receive, a request to automate the at least one process;

extract, at least one feature associated with the at least one process by defining at least one process definition to obtain a declarative model, wherein the at least one features corresponds to at least one of: (i) meta-data, (11) control information, (111) parameters, (iv) data entities, (v) security information, (vi) process model, and (vii) user-interaction points subsections, wherein the at least one feature associated with the at least one process executes the at least one process in an automated way by auto-generating screens, providing insights into the at least one process execution, controlling the at least one process execution and interacting with a plurality of users for the at least one process under automation;

generate, an automation code specific to the at least one process to be automated based on the process definition, wherein the generation of the automation code considers historical execution of the at least one process and related execution data for handling request for the at least one process execution;

validate, the declarative model of the at least one process with the generated automation code to obtain a process automation package;

provision, the declarative model to access the process automation package to obtain a plurality of specific roles associated with the at least one process, wherein the process automation package comprises (1) the process definition, and (ii) a process automation code as a single distributable entity;

execute, the process automation package in a process automation platform based on the obtained plurality of specific roles to obtain a plurality of states associated with a process execution;

and dynamically monitor, the plurality of states associated with the process execution and automatically triggering at least one action associated with the plurality of states of the process execution in the process automation platform, wherein the plurality of states of the process execution corresponds to at least one of (1) failed, (i1) stopped, and (iii) completed, wherein if the state of the process execution is failed, then the associated action is identifying root cause of failure and take corrective action, and wherein if the state of the process execution is stopped, then the associated action is working with a user to understand why the execution is stopped without completion and check for any new changes to the process, wherein a security-controlled user interface is provided with no limit on schema, and number of the data entities to be managed for the at least one process execution and dynamically validating the data entities based on a declaration schema of the data entities.

11. The system of claim 10, wherein the declarative model comprises of a plurality of sections to specify the process definition.

12. The system of claim 10, wherein the metadata comprises additional process information comprising name, description, author, version, and details regarding creation of process.

13. The system of claim 10, wherein the control information comprises supplementary information of the at least one process, including version and details about compatibility of the process automation platform.

14. The system of claim 10, wherein the parameters comprise at least one input associated with the at least one process along with at least one of (i) corresponding type, (ii) data restrictions, and (iii) default values.

15. The system of claim 10, wherein the data entities comprise definition of the data entities required for the process automation platform to manage the process.

16. The system of claim 10, wherein the security information comprises at least one security identifier that defines a plurality of dynamic access levels of the process which can be managed by the process automation platform for the plurality of users.

17. The system of claim 10, wherein the user interaction points subsections defines standard or custom user interfaces to interact with one or more users of the process automation platform at specific points during the execution of the at least one process.

18. The system of claim 10, wherein the declarative model comprises information on action of breaking down the at least one process into one or more subsections, and wherein each subsection maintains a tracking information on the at least one process.

* * * * *